United States Patent [19]

Ebata et al.

[11] 4,173,460
[45] Nov. 6, 1979

[54] PROCESS FOR WELDING PLATE GLASSES TOGETHER

[75] Inventors: Yoshihiro Ebata, Kawanishi; Tsutomu Ueno, Ikeda; Nagamasa Kataoka, Kawanishi; Akimasa Akao, Higashi-murayama, all of Japan

[73] Assignees: Agency of Industrial Science and Technology; Central Glass Company, Limited

[21] Appl. No.: 909,692

[22] Filed: May 25, 1978

[30] Foreign Application Priority Data

May 26, 1977 [JP] Japan .................................. 52/62007

[51] Int. Cl.$^2$ ............................................. C03C 27/00
[52] U.S. Cl. ......................................... 65/40; 65/106; 65/DIG. 4
[58] Field of Search ................. 65/103, 104, 106, 107, 65/273, 275, 288, DIG. 4, 40

[56] References Cited

U.S. PATENT DOCUMENTS 2,527,720  10/1950  Guyer .................................... 65/40

FOREIGN PATENT DOCUMENTS 960351  6/1964  United Kingdom ....................... 65/40

Primary Examiner—Arthur D. Kellogg
Attorney, Agent, or Firm—Fleit & Jacobson

[57] ABSTRACT

The contacted edge portions of plate glasses to be joined are locally heated to a temperature higher than in the other portions of the plate glasses, after the whole of the plate glasses is heated. Electric current is then passed to the edge portions in order to further heat the edge portions so that the edges of the plate glasses are molten and welded together.

9 Claims, 9 Drawing Figures

PROCESS FOR WELDING PLATE GLASSES TOGETHER

BACKGROUND OF THE INVENTION

This invention relates to a process and apparatus for joining plate glasses, and more particularly to a process and apparatus for welding edges of plate glasses to make an article constructed by the plate glasses.

It is well known in the art, that the adjacent edges of plate glasses are joined together by using adhesives or joining members in order to, for example, produce a showcase constructed by plate glasses. However, joined portions with such adhesives or joining members do not look fine externally and therefore defile the appearance of the showcase. It will be understood that the appearance or beauty is very important and essential for articles constructed by plate glasses such as the showcase.

SUMMARY OF THE INVENTION

It is a main object of the present invention to provide an improved process and apparatus for joining plate glasses by which beautiful and fine articles constructed by plate glasses can be obtained, allowing high accuracy of the dimensions and the shape of the constructed articles.

It is another object of the present invention to provide an improved process and apparatus for joining the adjacent edges of plate glasses, by which beautiful and transparent joined portions of the plate glasses can be obtained, making beautiful and fine articles constructed by plate glasses.

It is a further object of the present invention to provide an improved process and apparatus for welding the adjacent edges of plate glasses, in which the edges of the plate glasses are welded to each other by heating the edges to a high temperature for welding them, by passing electric current to the edges of the plate glasses.

Other objects, features and advantages of the process and apparatus according to the present invention will be more apparent from the following description taken in conjunction with the accompanying drawings.

DESCRIPTION OF THE PREFERRED EMBODIMENT

Figure 1:
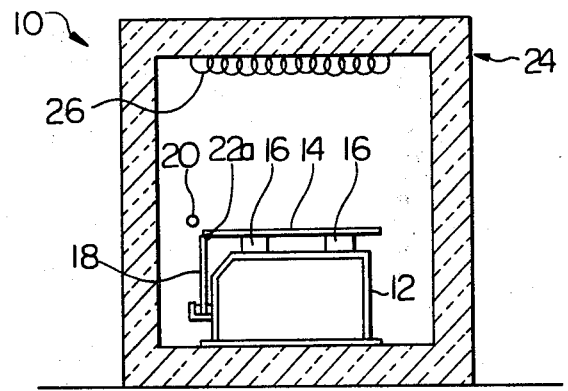
FIG. 1 is a schematic section view of a preferred embodiment of an apparatus in accordance with the present invention.
Figure 2:
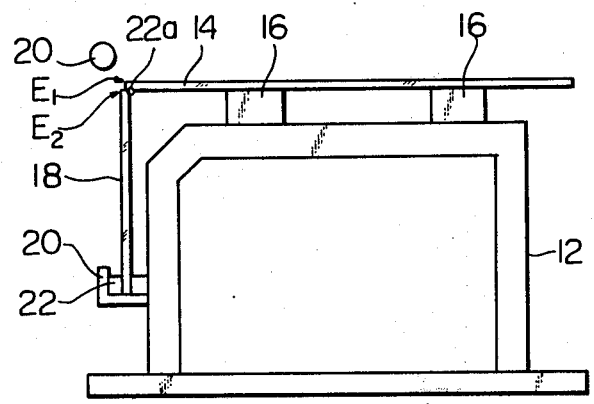
FIG. 2 is an enlarged schematic section view of a part of the apparatus of FIG. 1.

Referring now to FIGS. 1, 2, 3A and 4 of the drawings, there is shown a preferred embodiment of an apparatus 10 for welding plate glasses, in accordance with the present invention. The apparatus 10 is composed of a table or stand 12 made of a heat resistant material. In this instance, a first plate glass 14 is mounted on the table 12 through supporting members 16 each of which is made of ceramics or porcelain to electrically insulate the table 12 from the plate glass 14. The first plate glass 14 has, in this instance, the dimensions 42 cm length, 23 cm width and 5 mm thickness. As shown, an edge $E_1$ of the first plate glass 14 is disposed to be contacted to an edge $E_2$ of a second plate glass 18 which is supported by a supporting member 20 of an insulating material, which supporting member 20 is secured to the table 12. The table 12 is electrically insulated from the second plate glass 18 by the insulating effect of mica 22.

Figure 3A:
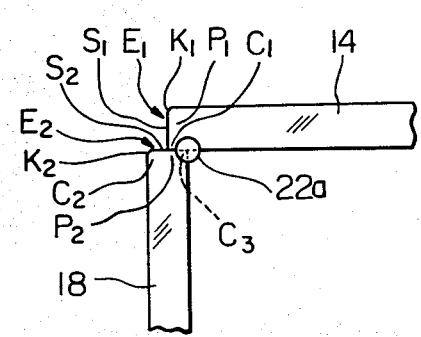
FIG. 3A is a side view of a portion around the contacted edges of plate glasses which are mounted on the apparatus of FIG. 1.

As seen from FIG. 3A, the two edges $E_1$ and $E_2$ of the first and second plate glasses 14 and 18 are so contacted that the flat surface $S_1$ of the second plate glass edge $E_1$ is angularly arranged relative to the flat surface $S_2$ of the second plate glass edge $E_2$. In this instance, the flat surface $S_1$ is arranged substantially perpendicular to the flat surface $S_2$. Furthermore, the first and second plate glasses 14 and 18 are in the relationship wherein a corner $C_1$ of the edge $E_1$, contacted to the flat surface $S_2$, is spaced apart from the two corners $C_3$ and $C_4$ of the second plate glass edge $E_2$. In this instance, the corner $C_1$ lies generally on a longitudinal center line (not shown) of the flat surface $S_2$ of the second plate glass edge $E_2$.

The reference numeral 20 denotes a heating unit which is positioned in close proximity to edge portions $P_1$ and $P_2$ of the first and second plate glasses by a known supporting means (not shown), each edge portion including each edge $E_1$ or $E_2$. This heating unit 20 functions to locally heat the edge potions $P_1$ and $P_2$ which are contacted with each other.

Figure 4:
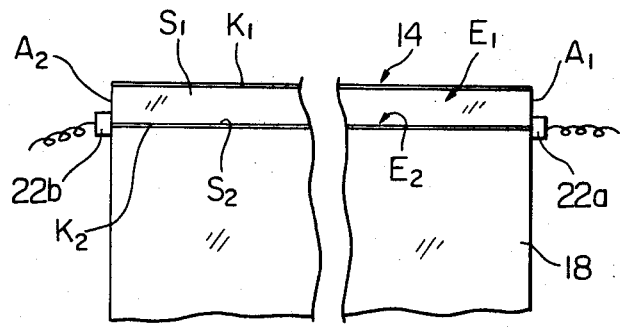
FIG. 4 is a front view showing locations of pair of electrodes for passing electric current to the edge portions of plate glasses to be welded.

As clearly shown in FIG. 4, a pair of electrodes 22a and 22b which are in contact with the both side surfaces $A_1$ and $A_2$ of the respective contacted edge portions $P_1$ and $P_2$. The electrodes 22a and 22b are electrically connected through lead wires (no numerals) to an electric source (not shown) to be supplied with electric current from the electric source. Each electrode is made, for example, of a stainless steel, molybdenum, graphite or platinum. The electrodes 22a and 22b lightly touch on the side surfaces $A_1$ and $A_2$ to prevent the edge portions $P_1$ and $P_2$ (when softened) from being warped or injured due to the urging action of the contacted electrodes 22a and 22b. The plate glasses 14 and 18 are disposed in an electric oven 24 equipped with an electric heating wire 26 for heating the whole of the plate glasses 14 and 18.

With the thus arranged apparatus 10, the whole of the contacted plate glasses 14 and 18 located as shown in FIG. 1 is heated to a predetermined temperature such as about 350° C. in the electric oven 24. Then, the edge portions $P_1$ and $P_2$ of the first and second plate glasses 14, 18 are heated to a predetermined temperature (such as 500° C.) which is higher than that in the other portions of the plate glasses and lower than the softening temperatures of the first and second plate glasses 14 and 18. Accordingly, the edge portions $P_1$ and $P_2$ of the first and second plate glasses 14 and 18 are kept at about 500° C., while the other portions of the plate glasses are kept at about 350° C. By thus heating the whole of the plate glasses, the plate glasses can be prevented from breaking due to local heating of the edge portions $P_1$ and $P_2$.

Figure 3B:
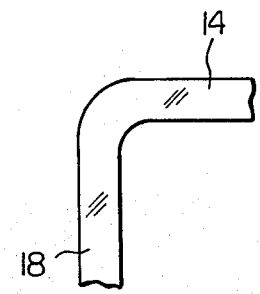
FIG. 3B is a side view of a welded portion of plate glasses, which portion is formed in accordance with the present invention.

A voltage of 5,000 V is impressed on the electrodes 22a and 22b so that electric current of about 0.7-0.9A is passed through the electrodes 22a and 22b to the edge portions $P_1$ and $P_2$ of the first and second plate glasses 14 and 16. It is to be noted that an electric circuit having the least electric resistance can be completed through the edge portions $P_1$ and $P_2$ since the locally heated edge portions $P_1$ and $P_2$ are decreased in electrical resistance as compared with the other portions of the plate glasses 14 and 18. Consequently, the temperature in the edge portions $P_1$ and $P_2$ reaches to a level (such as 1200° C.) at which the edges $E_1$ and $E_2$ can be welded to each other. Then, the edges $E_1$ and $E_2$ of the first and second plate glasses 14 and 18 are welded to each other and the welded portion is smoothly rounded to the shape as shown in FIG. 3B by virtue of surface tension of the slightly molten glasses. Thereafter, electric current supply to the heating unit 20 and electrodes 22a, 22b is stopped and electric current supply to the heating wire 26 is controlled to slowly cool the whole of the first and second plate glasses 14 and 18 to room temperature to anneal the welded first and second plate glasses. This provides a stable welded glass without internal stresses. Otherwise, supply of electric current may be continued after the welding is finished to further uniformly heat the whole of the welded glasses to, for example, 630° C. and thereafter the welded glasses may be rapidly chilled or tempered to obtain a strengthened tempered glass.

Figure 5A:
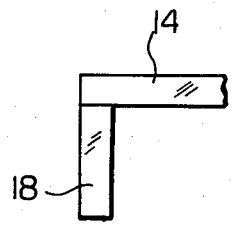
FIG. 5A is a side view showing a manner of contacting the edges of plate glasses prior to welding, which manner is not preferable.
Figure 5B:
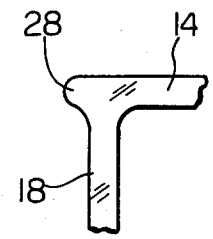
FIG. 5B is a side view showing an welded portion which results from the edge contacting manner of FIG. 5A.
Figure 6A:
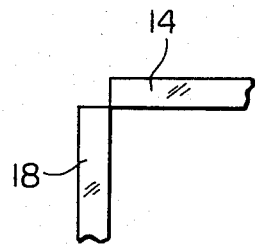
FIG. 6A is a side view similar to FIG. 1, but shows another manner which is also not preferable.
Figure 6B:
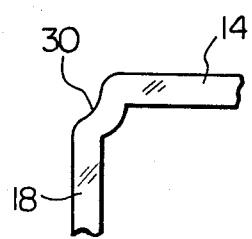
FIG. 6B is a side view similar to FIG. 5B, but showing another welded portion which results from the edge contacting manner of FIG. 6A.

It is to be noted that it is preferable for the purpose of obtaining the good welded portion as shown in FIG. 3B to locate, before welding, the edges $E_1$ and $E_2$ of the first and second plate glasses 14 and 18 as shown in FIG. 3A in which the corner $C_1$ of the first plate glass edge $E_1$ lies spaced apart from the both corners $C_2$ and $C_3$ of the second glass edge $E_2$. Because, if the edges of first and second plate glasses 14 and 18 are located as shown in FIG. 5A before welding, a projection 28 may be formed as shown in FIG. 6 on the welded portion. If the edges of the first and second plate glasses 14 and 18 are located as shown in FIG. 6A before welding, a depression 30 may be formed at the welded portion as shown in FIG. 6B.

It is also preferable as shown in FIGS. 3A and 4 that the two edges $E_1$ and $E_2$ of the first and second plate glasses 14 and 18 are so contacted, before welding, that the streaks or scratches $K_1$ and $K_2$ (only their cross-sections shown) of the first and second plate glasses 14 and 18 never contact the surfaces of the second and first glasses 18 and 14, respectively, in order to avoid formation of bubbles in the welded portion shown in FIG. 3B and to obtain a smooth surface of the same welded portion. It is to be noted that the streaks or scratches were formed by a glass cutter during cutting operation therefore they are formed along a corner of each plate glass edges $E_1$ and $E_2$.

What is claimed is:

1. A process for welding first and second plate glasses, comprising:
    contacting an edge of the first plate glass with an edge of the second glass, each edge forming part of an edge portion of each plate glass, the step of contacting the edges of the first and second plate glasses including the steps of placing the edge of the first plate glass on the edge of the second plate glass so that the flat surface of the edge of the first plate glass is angularly arranged relative to the flat surface of the edge of the second plate glass, and contacting a corner of the edge of the first plate glass to the flat surface of the edge of the second plate glass at a location such that the corner of the edge of the first plate glass is in a spaced apart relationship between the two corners of the edge of the second plate glass;
    heating the whole of the contacted first and second plate glasses to a first predetermined temperature;
    locally heating the contacted edge portions of the first and second plate glasses to a second predetermined temperature which is higher than that in the other portions of the plate glasses and lower than the softening temperature of the plate glasses, said second predetermined temperature being higher than said first predetermined temperature; and
    passing electric current to the contacted edge portions through a pair of electrodes which are in contact with both side surfaces of the contacted edge portions, respectively, to generate heat for welding the edges of the first and second plate glasses.

2. A process as claimed in claim 1, further comprising the step of contacting said pair of electrodes to the both side surfaces of the contacted edge portions of the first and second plate glasses, respectively, before the step of passing through electric current.

3. A process as claimed in claim 1, wherein the step of heating the whole of the contacted first and second plate glasses is carried out in an electric oven equipped with electric heating means.

4. A process as claimed in claim 3, wherein said first predetermined temperature is about 350° C.

5. A process as claimed in claim 3, wherein the step of heating the contacted edge portions is carried out by heating means disposed near the contacted edge portions of the first and second plate glasses.

6. A process as claimed in claim 5, wherein said second predetermined temperature is about 500° C.

7. A process as claimed in claim 1, the step of passing electric current is carried out by impressing a voltage of about 5,000 V on said pair of electrodes.

8. A process as claimed in claim 1, wherein the flat surface of the edge of the first plate glass is perpendicular to the flat surface of the edge of the second plate glass.

9. A process as claimed in claim 1, wherein the step of contacting the edges of the first and second plate glasses includes the step of putting the edge of the first plate glass on the edge of the second plate glass so that the streaks formed at corners of first and second glasses are prevented from contacting with the surfaces of the second and first plate glasses, respectively.

* * * * *